(12) United States Patent
Friederichs et al.

(10) Patent No.: US 10,556,779 B2
(45) Date of Patent: Feb. 11, 2020

(54) CABLE WINCH AND CABLE DRUM

(71) Applicant: JENOPTIK Advanced Systems GmbH, Wedel (DE)

(72) Inventors: Ralf Friederichs, Hamburg (DE); Joachim Schmidt, Tornesch (DE); Kai Thron, Pinneberg (DE)

(73) Assignee: JENOPTIK Advanced Systems GmbH, Wedel (DE)

( * ) Notice: Subject to any disclaimer, the term of this patent is extended or adjusted under 35 U.S.C. 154(b) by 39 days.

(21) Appl. No.: 15/748,566

(22) PCT Filed: Jul. 29, 2016

(86) PCT No.: PCT/EP2016/068148
§ 371 (c)(1),
(2) Date: Jan. 29, 2018

(87) PCT Pub. No.: WO2017/017250
PCT Pub. Date: Feb. 2, 2017

(65) Prior Publication Data
US 2018/0215594 A1  Aug. 2, 2018

(30) Foreign Application Priority Data

Jul. 30, 2015 (DE) .................. 10 2015 009 700

(51) Int. Cl.
| | |
|---|---|
| *B66D 1/74* | (2006.01) |
| *B64D 1/22* | (2006.01) |
| *B66D 1/38* | (2006.01) |
| *B66D 1/76* | (2006.01) |

(52) U.S. Cl.
CPC ............ *B66D 1/741* (2013.01); *B64D 1/22* (2013.01); *B66D 1/38* (2013.01); *B66D 1/7442* (2013.01); *B66D 1/76* (2013.01); *B66D 2700/0183* (2013.01)

(58) Field of Classification Search
CPC . B66D 1/36; B66D 1/741; B66D 1/38; B66D 1/7421; B66D 1/7442; B66D 2700/0183
See application file for complete search history.

(56) References Cited

U.S. PATENT DOCUMENTS

| | | | |
|---|---|---|---|
| 1,397,911 A | 11/1921 | Tossizza | |
| 3,003,235 A | 10/1961 | Temple et al. | |
| 3,074,320 A | 1/1963 | Trifonoff | |

(Continued)

FOREIGN PATENT DOCUMENTS

| | | | | |
|---|---|---|---|---|
| AU | 4923879 A | * | 1/1980 | ........... B66D 1/7421 |
| CH | 134446 A | | 7/1929 | |

(Continued)

OTHER PUBLICATIONS

International Search Report for International Application No. PCT/EP2016/068148 dated Oct. 8, 2016.

*Primary Examiner* — Emmanuel M Marcelo
(74) *Attorney, Agent, or Firm* — Muncy, Geissler, Olds & Lowe, P.C.

(57) ABSTRACT

A cable winch having a receiving unit for accommodating a cable drum that includes a cable wound about an axis of the cable drum. The receiving unit includes a quick mounting mechanism for attaching the cable drum in a manually detachable manner to the cable winch.

15 Claims, 7 Drawing Sheets

(56) References Cited

U.S. PATENT DOCUMENTS

| | | | |
|---|---|---|---|
| 3,240,474 A | | 3/1966 | Garnier |
| 3,290,013 A | | 12/1966 | Walsh et al. |
| 3,870,255 A | | 3/1975 | Lemont |
| 4,009,898 A | * | 3/1977 | Hampton ............... B66C 1/625 294/31.2 |
| 4,157,019 A | * | 6/1979 | Von Allworden ..... A01B 71/08 403/314 |
| 2003/0205121 A1 | | 11/2003 | Florian et al. |
| 2006/0091834 A1 | | 5/2006 | Alipour et al. |
| 2010/0051890 A1 | * | 3/2010 | Lauder ................... B64C 27/10 254/382 |
| 2011/0108289 A1 | * | 5/2011 | Breard ................... B65H 67/02 166/385 |
| 2013/0098214 A1 | | 4/2013 | Birkeland |
| 2013/0283794 A1 | | 10/2013 | Taillemite |
| 2014/0166270 A1 | * | 6/2014 | Varkey ................... E21B 41/00 166/250.01 |

FOREIGN PATENT DOCUMENTS

| | | | | |
|---|---|---|---|---|
| CN | 203048472 U | | 7/2013 | |
| CN | 103879915 A | | 6/2014 | |
| CN | 203639032 U | | 6/2014 | |
| CN | 2017-54314 C | * | 8/2017 | ............... B66D 1/14 |
| DE | 709 934 C | | 8/1941 | |
| EP | 2 625 426 | | 9/2013 | |
| WO | WO 2006/015267 A2 | | 2/2006 | |

\* cited by examiner

CABLE WINCH AND CABLE DRUM

This nonprovisional application is a National Stage of International Application No. PCT/EP2016/068148, which was filed on Jul. 29, 2016, and which claims priority to German Patent Application No. 10 2015 009 700.8, which was filed in Germany on Jul. 30, 2015, and which are both herein incorporated by reference.

BACKGROUND OF THE INVENTION

Field of the Invention

The present invention relates to a cable winch and a cable drum.

Description of the Background Art

For full functionality of a cable winch used, for example, as a rescue winch in a rescue helicopter, it must be possible to exchange the cable of the cable winch. For this purpose, the cable is unwound from a cable drum firmly connected to the winch. An auxiliary cable is attached to the cable end and pulled through the cable guide system. The same occurs—when using a cable winch in accordance with the capstan system—after the auxiliary cable has been exchanged, from the hook to the drum. During this process, the drum end of the cable is connected to the drum by means of a clamping element. The procedure is similar in the case of direct winders.

SUMMARY OF THE INVENTION

It is therefore an object of the present invention to provide a cable winch and a cable drum in accordance with the main claims. Advantageous embodiments will be found in the respective dependent claims and the following description.

A cable winch which is configured with a receiving unit for accommodating a cable drum fitted with a cable, which receiving unit has a quick mounting mechanism for attaching the cable drum in a manually detachable manner to the cable winch, makes it possible to achieve quicker exchange of the cable in that a cable drum can be removed together with the wound-on cable and replaced by a new cable drum with a wound-on cable.

The locking and unlocking of the cable drum by means of the quick mounting mechanism offers the advantage that no tools are required for drum exchange. Thus, it is possible to save time and costs. Moreover, the complexity of the drum can be limited to such an extent that adjusting work is superfluous.

According to the concept presented here, it is unnecessary to unwind the complete cable from the cable drum and/or to wind on a new cable. It is thereby possible to considerably reduce the time expended in making a necessary cable change—e.g. on a rescue winch on a helicopter. By virtue of the quicker and less complex work sequence when changing the cable, it is possible to save on maintenance efforts and thus costs, the availability of the winch can be increased and, after the cable has been changed, the helicopter can be more quickly available again for operations.

Changing the cable of a cable winch constructed in accordance with the concept presented here can furthermore be carried out without much prior knowledge. Brief training for the operating personnel may be sufficient.

A cable winch has the following features:
a receiving unit for accommodating a cable drum that includes a cable wound about an axle of the cable drum, wherein the receiving unit has a quick mounting mechanism for attaching the cable drum in a manually detachable manner to the cable winch; and
a drive unit having at least one driving pulley, wherein the drive unit is positioned ahead of the receiving unit in a winding direction of the cable onto the cable drum and is designed to provide at least a proportion of a pulling force for raising a load by means of the cable, and wherein the drive unit is designed to receive a free cable end of the cable from the cable drum and to guide the cable.

The cable winch can be taken to mean lifting gear for lifting and moving loads. The cable winch can be used on a transport helicopter for carrying loads, for example, or as a rescue winch on a rescue helicopter for rescuing people who have got into difficulty. The receiving unit can be taken to mean a section of a housing of the cable winch into which the cable drum can be inserted. For example, the receiving unit can have two receiving regions for accommodating two end regions of the axle of the cable drum. The cable drum can be used to carry and store the cable. The cable drum can be mounted rotatably on the receiving unit. Thus, the cable can be wound onto the cable drum by rotating the cable drum in a winding direction in order to wind in a load attached to the cable and can be unwound from the cable drum to lower the cable to earth by rotating the cable drum in an unwinding direction counter to the winding direction. The quick mounting mechanism can be of single- or multi-part construction and can be designed to be managed quickly and without tools by a cable winch operator in order to change the cable drum on the cable winch. The quick mounting mechanism can be designed to produce a positive and/or nonpositive engagement between the cable drum and the winch housing. By means of the drive unit, it is possible to make the cable winch operate in the manner of a driving pulley winch (capstan). In this way, it is possible to ensure a uniform pulling force of the cable winch. The possibility of accommodating the free cable end of the cable makes it possible to use a cable drum which is already fitted with a cable. The cable end can be provided with a ball to enable the cable to be fitted with a hook. The drive unit with the at least one driving pulley can be designed in such a way that the cable performs at least one turn, preferably several turns, on the driving pulley. Thus, this driving pulley differs from a deflection pulley, on which the cable does not perform a complete turn.

The driving pulley can have a cable guide surface for guiding the plurality of turns of the cable. In this way, the pulling force of the cable winch can be made particularly balanced.

The drive unit can be designed to be operated electrically and/or hydraulically.

According to one embodiment, the drive unit can have at least one guide plate for guiding the cable on a cable guide surface of the driving pulley. By means of the guide plate, it is possible to prevent the cable from being wound onto the driving pulley in a disordered manner and thus to prevent squeezing of the cable.

According to one particular embodiment, the guide plate can be arranged or can be arrangeable on a housing of the drive unit by means of a hinge in such a way that it can be pivoted about a pivoting axis between a first position and a second position. Thus, the cable end can be inserted easily into the drive unit from the cable drum.

In particular, an inner side of the guide plate can be spaced apart from a cable guide surface of the driving pulley to such an extent in the first position of the guide plate that no more than one layer of the cable is guided on the cable guide surface during guidance of the cable in the drive unit. In the second position of the guide plate, the inner side of the guide plate can be spaced further apart from the cable guide surface than in the first position. By means of this embodiment, it is possible in particular to easily guide a cable ball arranged on the cable end through the drive unit.

According to one embodiment, the hinge can be arranged opposite a cable discharge region of the cable from the drive unit to a remaining region of the cable winch, said remaining region having the receiving unit. In this way, the guidance of the cable by means of the guide plate can be ensured in an optimum manner.

According to another embodiment, the drive unit can have a further driving pulley, which is clamped or can be clamped against the driving pulley. In particular, the drive unit can have a further guide plate for guiding the cable on a cable guide surface of the further driving pulley. The further driving pulley can advantageously assist compensation of the pulling force by means of the drive unit. By means of the further guide plate, optimum guidance of the cable through the drive unit can be ensured even more effectively.

The further guide plate can be arranged or can be arrangeable on the housing of the drive unit by means of a further hinge in such a way that it can be pivoted about a pivoting axis between a first position and a second position.

It is also possible for the drive unit to have a guide roller. The guide roller can be positioned ahead of the driving pulley in the winding direction of the cable onto the cable drum and can be designed to guide the cable in a cable discharge region of the cable from the drive unit to a remaining region of the cable winch, said remaining region having the receiving unit. The guide roller can improve cable guidance in the drive unit without further measures.

The guide roller too can be arranged or can be arrangeable on the housing of the drive unit in such a way that it can be pivoted about a pivoting axis between a first position and a second position. In this case, the guide roller can be in contact in the first position with a cable guided in the drive unit, and can be spaced apart in the second position from a cable guided in the drive unit. With this embodiment too, it is possible to ensure that a cable ball arranged on the cable end can be guided easily through the drive unit.

According to one embodiment, the quick mounting mechanism can have a first quick mounting device for fixing a first end section of the axle of the cable drum on the cable winch and/or can have a second quick mounting device for fixing a second end section, situated opposite the first end section, of the axle of the cable drum on the cable winch. In this way, the cable drum can be attached quickly and in an easily manageable way to the cable winch without further measures.

For example, the first quick mounting device and/or the second quick mounting device can be of two-part design. In this case, a first part of the first quick mounting device can be fixed on the cable winch and a second part of the first quick mounting device can be loose or freely movable in the uninstalled state of the quick mounting device and can be designed to be connected nonpositively and/or positively to the first part of the first quick mounting device in order to fix the first end section of the axle detachably on the cable winch. In corresponding fashion, a first part of the second quick mounting device can be fixed on the cable winch and a second part of the second quick mounting device can be loose or freely movable in the uninstalled state of the quick mounting device and can be designed to be connected nonpositively and/or positively to the first part of the second quick mounting device in order to fix the second end section of the axle detachably on the cable winch. In this way, the quick mounting device can be made even more optimally manageable.

It is also possible for one section of the first part of the first quick mounting device and/or one section of the first part of the second quick mounting device to be designed to fit around a partial circumferential surface of the axle. In corresponding fashion, one section of the second part of the first quick mounting device and/or one section of the second part of the second quick mounting device can be designed to fit around a further partial circumferential surface of the axle, said further partial circumferential surface being situated opposite the partial circumferential surface. By means of this embodiment of the receiving unit, an ability to rotate of the cable drum can be ensured in an optimum manner.

In particular, the quick mounting mechanism can be designed as a quick clamping mechanism. This can ensure a particularly quick and simple cable drum exchange.

A cable drum has a quick mounting mechanism for attaching the cable drum in a manually detachable manner to a cable winch.

By means of this variant embodiment of the invention in the form of a cable drum too, the object underlying the invention can be achieved quickly and efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
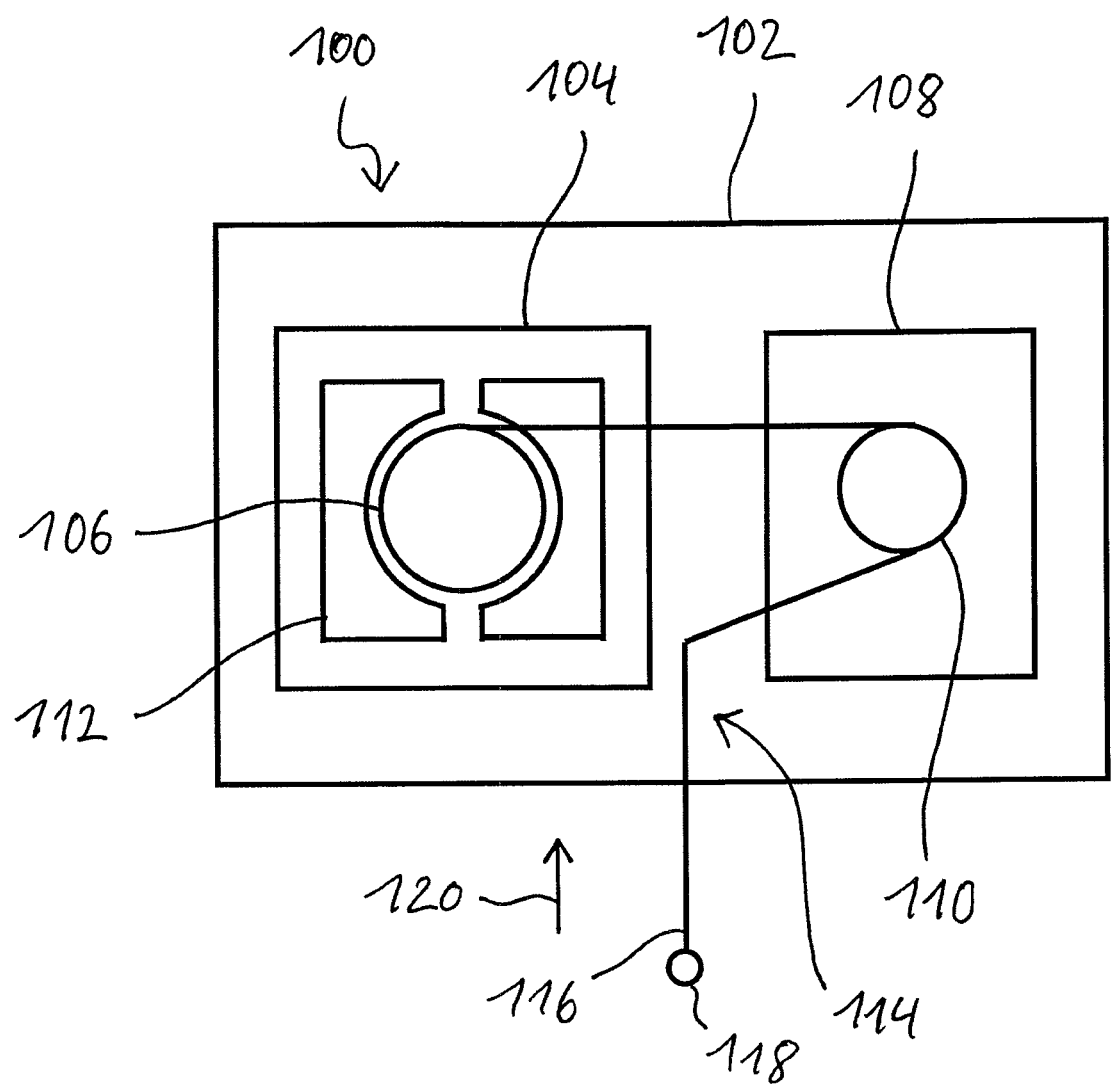
FIG. 1 shows a schematic illustration of a cable winch according to one illustrative embodiment of the present invention.

FIG. 1 shows a schematic illustration of a cable winch 100 according to one illustrative embodiment of the present invention. The cable winch 100 comprises a housing 102 having a receiving unit 104 for accommodating a cable drum 106 and comprises a drive unit 108 having a driving pulley 110.

The cable winch 100 can be used as a rescue winch on a rescue helicopter. In this case, the cable winch 100 is attached to the rescue helicopter via the housing 102. In the illustration in FIG. 1, the cable winch 100 is shown fitted with the cable drum 106. The receiving unit 104 is fitted with a quick mounting mechanism 112 for attaching the cable drum 106 in a detachable manner to the cable winch 100. The quick mounting mechanism 112 can be managed without tools by an operator of the cable winch 100 in order to be able to perform a quick cable change on the cable winch 100.

In the illustration in FIG. 1, a cable 114 of the cable drum 106 is shown as having been guided completely through the cable winch 100. A free end 116 of the cable 114 is passed from the cable drum 106 to the drive unit 108, is there laid in one or more turns in a single layer around the driving pulley 110 and is then passed downward out of the housing 102 of the cable winch 100 by means of one or more deflection rollers. A cable ball 118 is arranged at the end of the cable 114. A hook for the attachment of a load to the cable 114 can be attached to the cable ball 118, for example.

The fitting of the cable winch 100 shown in FIG. 1 with the drive unit 108 distinguishes the cable winch 100 as a driving pulley winch 100. The driving pulley 110 of the drive unit 108 is driven electrically or hydraulically and conveys the cable 114 resting thereon by means of frictional force. To lift a load attached to the cable 114, the drive unit 108 conveys the cable 114 in a winding direction 120, denoted by means of an arrow in the illustration, in the direction of the cable drum 106, which winds the cable 114 onto a drum axle. Accordingly, the drive unit 108 is arranged in the cable winch 100 ahead of the receiving unit 104 in the winding direction 120 of the cable 114.

According to illustrative embodiments, the cable winch concept presented herein can also be implemented on a simple cable winch which is not fitted with a drive unit.

Figure 2:
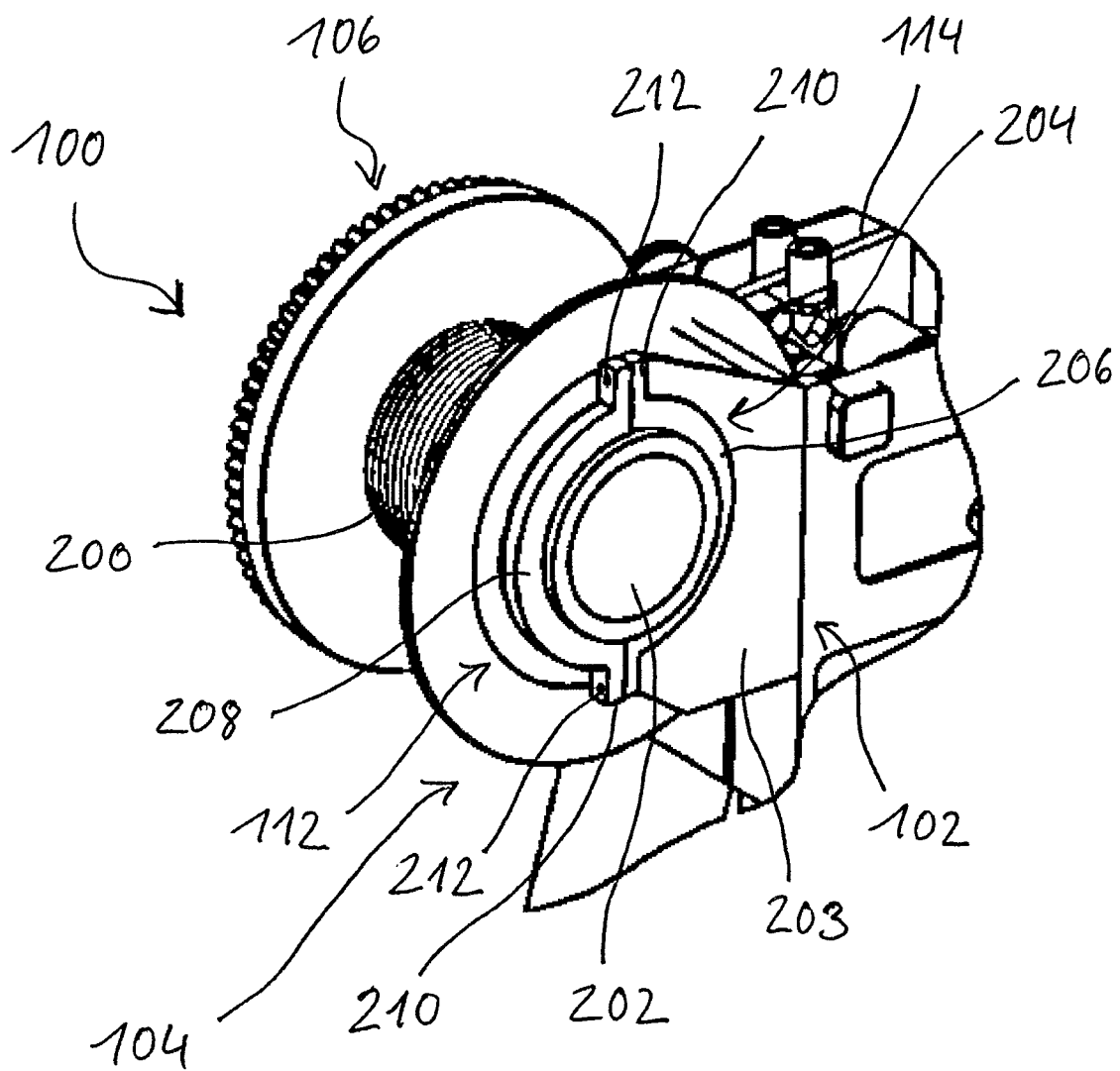
FIG. 2 shows an illustration of a mounted cable drum during the operation of a cable winch according to one illustrative embodiment of the present invention.

FIG. 2 shows, in perspective, a section of one variant of the cable winch 100 presented herein, which has the receiving unit 104. FIG. 2 shows a state of the cable winch 100 during operation. The cable drum 106 is locked on the receiving unit 104 by means of the quick mounting mechanism 112.

The cable drum 106 is used to carry and store the cable 114. For this purpose, the cable 114 is wound up on an axle 200 of the cable drum 106 in a plurality of turns and possibly layers. The axle 200 has a circular cross section. Two circular flange disks of the cable drum 106 hold the wound-up part of the cable 114 in position between them. From the winding region on the axle 200, the cable 114 is passed through two guide rollers to the drive unit (not shown in FIG. 2) of the cable winch 100.

The cable drum 106 is connected to the receiving unit 104 of the cable winch 100 by means of two mutually opposite end sections 202 of the axle 200, said end sections passing through the flange disks. Accordingly, two walls 203 of the housing 102 of the cable winch 100 each form a receiving region for receiving and supporting one of the axle end sections 202. For this purpose, the walls each form a semicircular recess for the rotatable support of the axle 200. The winding region of the cable drum 106 is thus positioned between the walls 203 of the receiving unit 104 in such a way as to be capable of rotating.

To lock the cable drum 106, the quick mounting mechanism 112 has two quick mounting devices 204, each of which is integrated into one of the semicircular recesses of the housing walls 203 of the receiving unit 104. Each of the quick mounting devices 204 is designed to attach a respective end region 202 of the axle 200 rotatably to the housing 102 of the cable winch 100.

In the illustrative embodiment of the cable winch 100 shown in FIG. 2, the quick mounting devices 204 are embodied as two-part quick acting clamping devices 204. Here, a first part 206 of each quick acting clamping device 204 is fitted firmly into the semicircular recesses of the receiving unit 104 and is firmly connected thereto. In the uninstalled state of the quick acting clamping device 204, a second part 208 of each quick acting clamping device 204 is loose and is designed to be connected nonpositively and/or positively to the respective first part 206 for the detachable fixing of the axle end sections 202.

In accordance with the circular-cylindrical shape of the axle 200, main sections of the respective first parts 206 and second parts 208 of the quick acting clamping devices 204 are embodied as semicircular clamps 206, 208, which are designed to jointly surround the axle 200 over the full circumference thereof. At their two ends, the first clamps 206 and second clamps 208 of the quick acting clamping devices 204 form connecting regions 210 extending away from the semicircular shape and having a through opening.

The quick acting clamping devices 204 are closed by placing the respective first clamps 206 under load against the respective second clamps 208 at the connecting regions 210 and fixing them against one another by means of a total of four fastening elements 212, in this case screws 212, in particular thumb screws, which are passed through the through openings.

As a departure from what is illustrated in FIG. 2, sections of the first parts 206 and the second parts 208 of the quick acting clamping devices 204 can be designed to each surround less than half the circumferential surface of the axle 200 in order to lock the cable drum 106. According to illustrative embodiments, it is also possible, instead of the screws 212, for other connecting elements to be used for the detachable connection of the first parts 206 to the second parts 208 of the quick acting clamping devices 204.

The embodiment of the quick mounting mechanism 112 shown in FIG. 2, having quick acting clamping devices 204 and thumb screws 212, allows particularly quick and uncomplicated exchange of the cable drum 106 since no tools are required to open and close the quick acting clamping devices 204.

Figure 3:
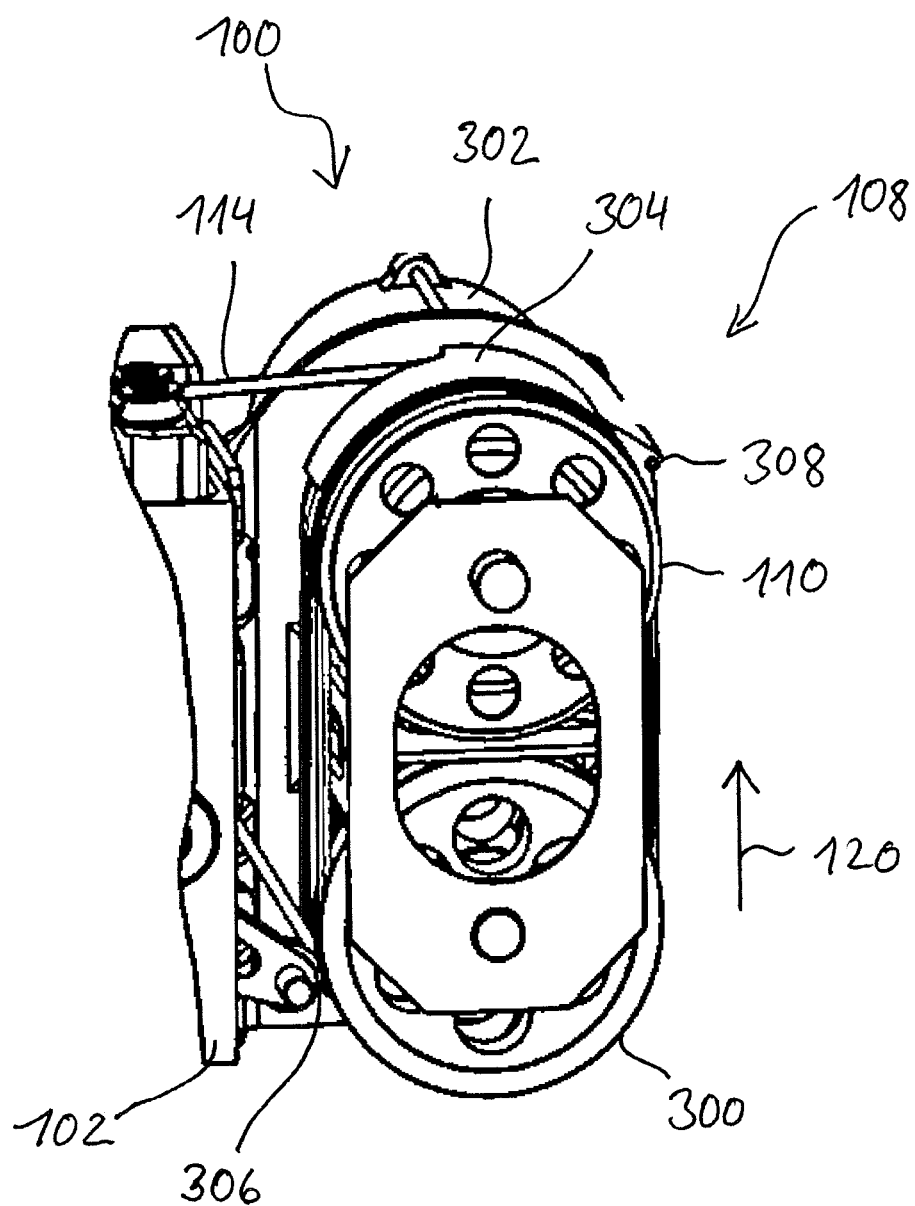
FIG. 3 shows an illustration of a drive unit of a cable winch during the operation of the cable winch according to one illustrative embodiment of the present invention.

FIG. 3 shows, in perspective, a section of the preferred variant of the cable winch 100 presented herein, which has the drive unit 108. FIG. 3 also shows the cable winch 100 during operation.

In the illustrative embodiment of the cable winch 100 shown in FIG. 3, the drive unit 108 has not only the driving pulley 110 but also a further driving pulley 300. The driving pulleys 110, 300 are arranged in alignment one below the other in a housing 302 of the drive unit 108, with the result that the respective axes of the driving pulleys 110, 300 are situated vertically precisely one above the other.

The cable 114, which is passed between the cable drum and the drive unit 108, is laid in a plurality of turns in a single layer around cable guide surfaces of the first driving pulley 110 and the second driving pulley 300 and, during the operation of the cable winch 100, is passed from the driving pulleys 110, 300 to the cable drum in the winding direction 120 of the cable 114 so as to be wound onto said drum. The driving pulleys 110, 300 are preloaded relative to one another and designed to exert a pulling force on the cable 114 in the winding direction 120 of the cable 114 by means of friction.

The drive unit 108 is fitted with a guide plate 304, a further guide plate and a guide roller 306. The further guide plate is not visible in the perspective view of the drive unit 108 illustrated in FIG. 3. The guide plates 304 and the guide roller 306 are designed to guide the cable 114 in a single layer on the cable guide surfaces of the driving pulleys 110, 300 during the operation of the cable winch 100.

In the operating state of the cable winch 100 which is shown in FIG. 3, the guides or guide plates 304 and the guide roller 306 are in contact.

The guide plate 304 is arranged on the housing 302 of the drive unit 108 by means of a hinge 308. By means of the hinge 308, the guide plate 304 can be pivoted about a pivoting axis between a first position and a second position.

In FIG. 3, the guide plate 304 is shown in the first position. Here, an inner side, i.e. a side of the guide plate 304 which faces the cable guide surface of the first driving pulley 110, is at a distance from the cable guide surface such that no more than one layer of the cable 114 is guided on the cable guide surface while the cable 114 is being guided during the operation of the cable winch 100. For example, a distance between the cable guide surface of the driving pulley 110 and the inner side of the guide plate 304 in the first position of the guide plate 304, which is shown in FIG. 3, is somewhat more than one cable thickness of the cable 114.

The hinge 308 is arranged opposite a cable discharge region of the cable 114 from the drive unit 108 to the remaining region of the cable winch 100, that having the receiving unit, the cable discharge region being at the top in the illustration in FIG. 3.

The further guide plate is arranged on the housing 302 of the drive unit 108 by means of a further hinge and can likewise be pivoted about a further pivoting axis between a first and a second position. In FIG. 3, the further guide plate too is in the first position, in which an inner side of the guide plate is at a distance from the cable guide surface of the further driving pulley 300 such that the cable 114 is guided in a single layer on the cable guide surface of the further driving pulley 300 as the cable 114 is guided during the operation of the cable winch 100.

The further hinge is arranged opposite a further cable discharge region of the cable 114 from the drive unit 108 to the remaining region of the cable winch 100, that having the receiving unit, said cable discharge region being at the bottom in the illustration in FIG. 3.

The guide roller 306 is positioned ahead of the driving pulleys 110, 300 in the winding direction 120 of the cable 114 onto the cable drum and is designed to guide the cable 114 to the cable guide surface of the further driving pulley 300 in the further cable discharge region.

In the illustrative embodiment shown in FIG. 3, the guide roller 306 is arranged on the housing 102 of the cable winch 100 by means of a joint (not visible in FIG. 3) and is likewise pivotable about a pivoting axis between a first and a second position. In FIG. 3, the guide roller 306 is shown in the first position, in which it is in contact with the cable 114 guided in the drive unit 108 and presses the cable 114 onto the cable guide surface of the further driving pulley 300.

Figure 4:
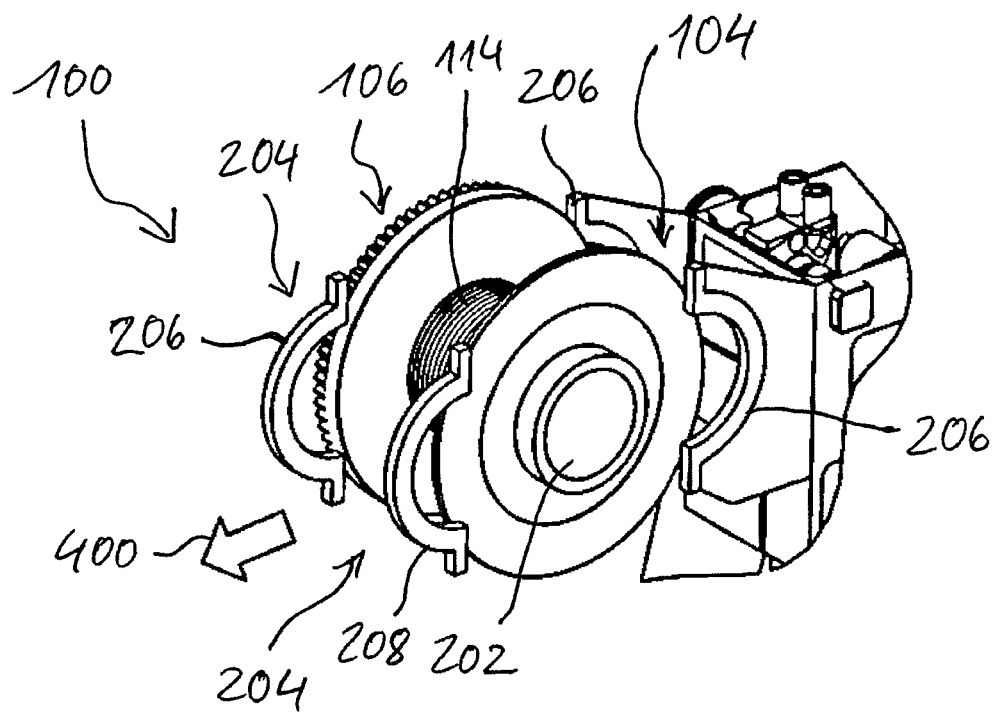
FIG. 4 shows an illustration of an open quick mounting mechanism for a cable change in a cable winch according to one illustrative embodiment of the present invention.

FIG. 4 shows, in a perspective illustration, an illustrative cable change for the preferred variant (presented in FIG. 2) of the cable winch 100 presented herein. In the case of the concept, presented here, of the simple cable change on a rescue winch for helicopters, the entire cable drum 106, including the cable 114, is exchanged in the cable change. This saves time and resources.

In FIG. 4, the quick acting clamping devices 204 that fix the two axle ends 202 of the cable drum 106 are open. To open the quick acting clamping devices 204, the screws connecting the respective first clamps 206 to the respective second clamps 208 have been unscrewed and removed. The cable drum 106 is thus no longer fixed, and an operator of the cable winch 100 can perform removal 400 (indicated by means of an arrow in the illustration) of the cable drum 106, including the cable 114 wound onto the cable drum 106, including the cable ball 118 arranged on the end of the cable and any hook that is present. The operator can then insert a new cable drum with a cable 114 and a cable ball 118 and with a hook attached to the cable ball into the receiving unit 104 and fasten it on the cable winch 100 by closing the quick acting clamping devices 204.

Figure 5:
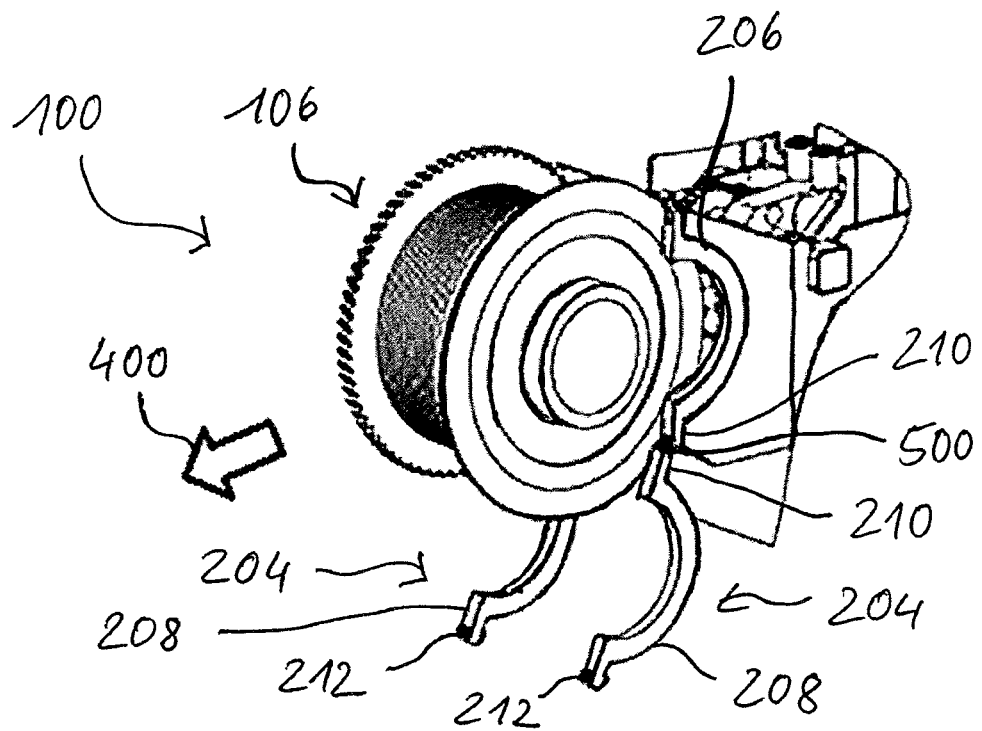
FIG. 5 shows an illustration of an open quick mounting mechanism for a cable change in a cable winch according to another illustrative embodiment of the present invention.

FIG. 5 shows the illustrative cable change in the preferred variant of the cable winch 100 presented in FIG. 2, with a variation in the construction of the quick acting clamping devices 204. Here, the respective first clamps 206 and second clamps 208 are connected permanently at the respective end of the quick acting clamping devices 204 which is at the bottom in the closed state of the quick acting clamping devices 204 by means of a respective connecting member 500 instead of a screw in the connecting regions 210.

The connecting members 500 are designed in such a way that, after the unscrewing of the screws 212 connecting the respective first clamps 206 to the respective second clamps 208 at the upper end of the quick acting clamping devices 204, they allow the second clamps 208 to be swung down or allow a free movement of the second clamps 208 relative to the first clamps 206. In this way too, the cable drum 106 is made accessible for removal 400.

Figure 6:
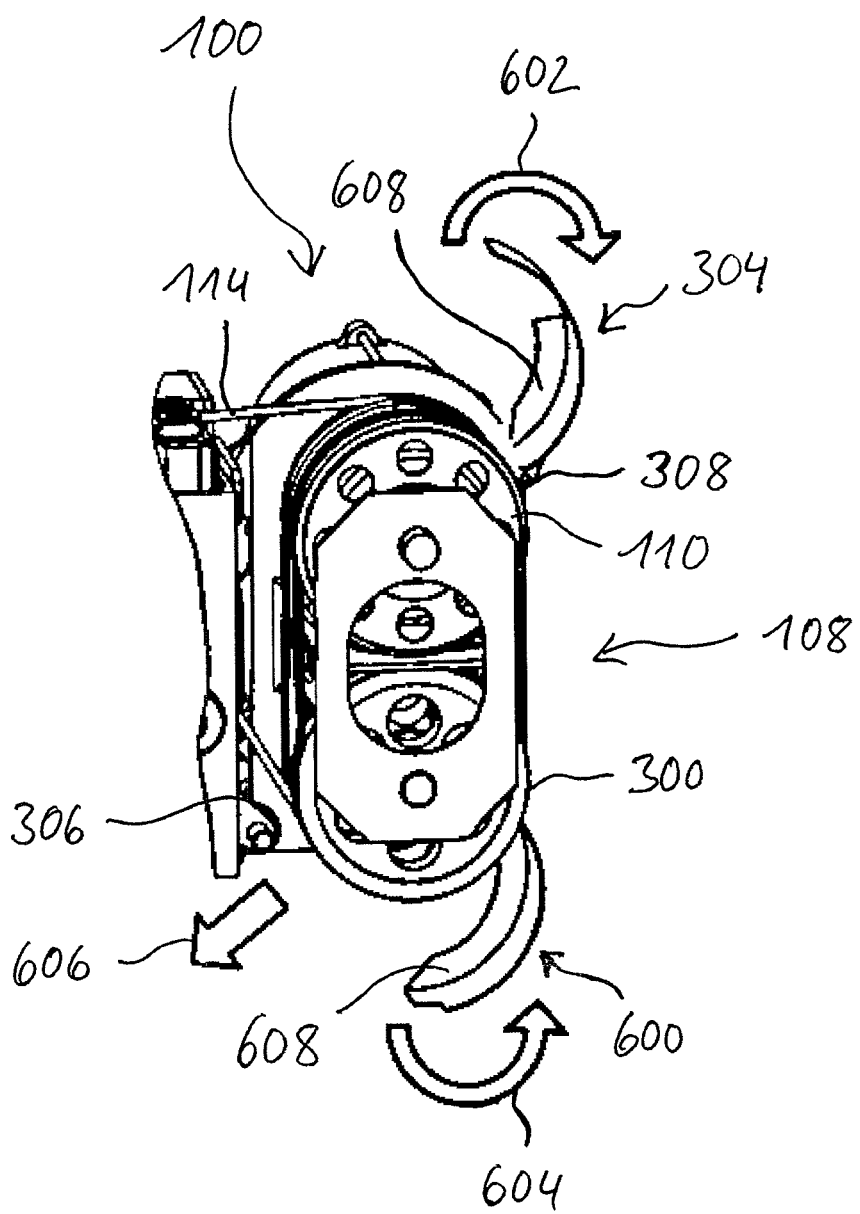
FIG. 6 shows an illustration of a drive unit of a cable winch during the cable change in the cable winch according to one illustrative embodiment of the present invention.

FIG. 6 shows an illustration of the illustrative drive unit 108 of the cable winch 100 from FIG. 3 during the cable change. Here, the guide plate 304, the further guide plate 600 and the guide roller 306 are shown in their respective second position. In their second positions, the guide plates 304, 600 and the guide roller 306 are swung or pivoted away from the driving pulleys 110, 300.

To be specific, the guide plate 304 has been pivoted away from the guide surface of the driving pulley 110 by means of the hinge 308 in a pivoting direction 602 indicated by means of an arrow in the illustration. The further guide plate 600 has been pivoted away from the guide surface of the further driving pulley 300 by means of the further hinge in a further pivoting direction 604 indicated by means of a further arrow in the illustration. The guide roller 306 has been moved further away from the guide surface of the further driving pulley 300 in a tilting or pivoting direction 606 indicated by means of a further arrow in the illustration.

The illustration in FIG. 6 shows clearly that, in the second position of the guide plates 304, 600, the distances of the inner sides 608 of the guide plates 304, 600 and of a rolling surface of the guide roller 306 from the cable guide surfaces of the associated driving pulleys 110, 300, are several times greater than those in the first position. Thus, a cable end of the cable 114 of a replacement cable drum newly inserted into the receiving unit of the cable winch 100 can be introduced easily and without aids into the drive unit 108 and laid around the driving pulleys 110, 300 in several turns.

The large opening in the drive unit 108, which has been created by swinging the guide plates 304, 600 and the guide roller 306 away, allows, in particular, the cable ball attached to the cable end to be pulled through the drive unit 108. The diameter of this ball is generally more than twice as great as the diameter of the cable 114. According to the concept, presented here, of the simplified cable change in the cable winch 100, the entire path of the cable 114 through the cable winch 100 is configured in such a way that the cable ball, which establishes the connection between the cable 114 and the hook, also fits through the winch mechanism of the drive unit 108.

In order to enable the new cable 114 to be pulled through as it is wound on and to enable it to be pulled into the winch mechanism of the cable winch 100, all the guide components 304, 306, 600 are therefore configured in such a way that the cable 114 with the ball situated thereon fits through or that guide plates 304, 600 or rollers 306 can be swung down. No tools are required for drum exchange and for the removal and insertion of the cable 114 from/into the winch mechanism. Thus, time and costs are saved.

Figure 7:
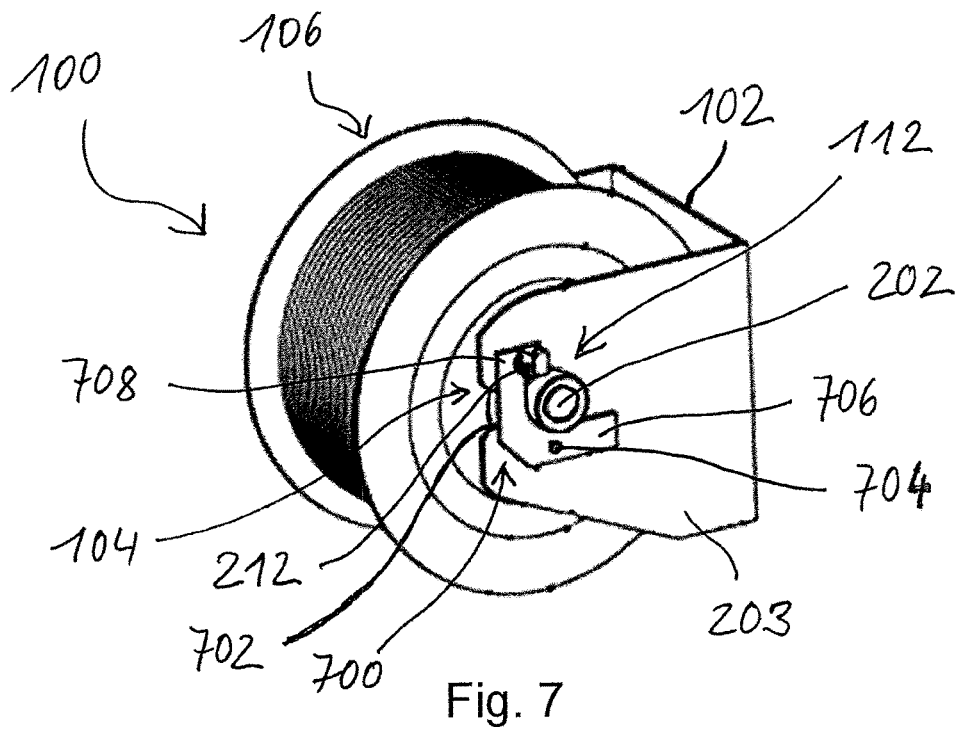
FIG. 7 shows an illustration of a mounted cable drum during the operation of a cable winch according to another illustrative embodiment of the present invention.

FIG. 7 shows, in perspective, a section of the cable winch 100 presented herein, with a variation of the configuration of the receiving unit 104. FIG. 7 shows a state of the cable winch 100 in operation. The cable drum 106 is locked on the receiving unit 104 by means of the quick mounting mechanism 112.

In the illustrative embodiment shown in FIG. 7, the quick mounting mechanism 112 comprises, instead of quick acting clamping devices, closing plates 700 in combination with fastening screws as the fastening elements 212. One closing plate 700 is used in each case to fix a respective axle end section 202 of the drum axle.

The housing walls 203 of the receiving unit 104 serve as holders for the cable drum 106 and are designed to rotatably support the drum axle. The receiving region for the drum axle is formed by guide slots 702 in the housing walls 203, wherein a clear width of the guide slots 702 corresponds approximately to a diameter of the drum axle. To enable the housing walls 203 to accommodate the cable drum 106 well, the housing walls 203 are made so deep that the mounted cable drum 106 can rotate freely without being blocked by other parts of the housing 102 of the cable winch 100.

The closing plates 700 are of angular design and are each arranged on the housing walls 203 of the receiving unit 104 in such a way as to be rotatable between a closing position and an opening position about a respective axis of rotation 704. Each axis of rotation 704 passes through a first leg 706 of the respective angular closing plate 700. A second leg 708 of the respective closing plate 700 can be moved in corresponding fashion between the closing position and the opening position by means of a rotation.

In the operating state of the cable winch 100 shown in FIG. 7, the quick mounting mechanism 112 is closed in that the closing plates 700 are in the closing position. In the closing position, the closing plates 700 form a fixing for the drum axle in that they extend in an L shape around the axle end sections 202. In the closing position, the second legs 708 of the closing plates 700 are arranged vertically and thus prevent the drum axle from slipping out of the guide slots 702. The cable drum 106 is locked by the closing plates 700 and the screw fastening 212.

Figure 8:
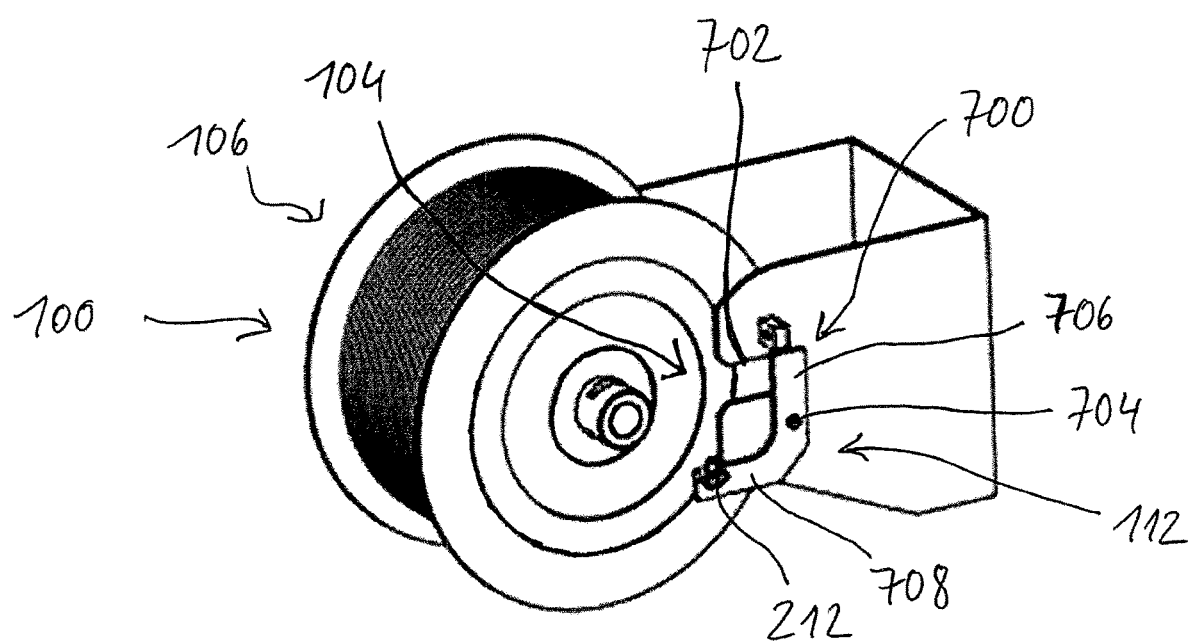
FIG. 8 shows an illustration of an open quick mounting mechanism for a cable change in a cable winch according to another illustrative embodiment of the present invention.

FIG. 8 shows, in a perspective illustration, an illustrative cable change for the variant of the cable winch 100 presented in FIG. 7. Here, the quick mounting mechanism 112 is shown in the opening position. The screws 212, in particular thumb screws, have been unscrewed and the closing plates 700 have been swung away downward, i.e. rotated downward about the axis of rotation 704 to such an extent that the second legs 708 of the closing plates 700 are now arranged horizontally and expose the guide slots 702 of the receiving unit 104.

The cable drum 106 can be removed by unscrewing the screw fastening 212 and pulling the drum 106 off. According to one embodiment, the closing plates 700 swing automatically downward and free the path for the drum axle. As the new drum 106 is introduced into the guide slots 702 of the holder for the cable drum 106, the closing plates 700 are rotated or pushed automatically to the stop position by the contact of the axle. The screw fastening 212 is then tightened again and the new cable drum 106 is secured. In this embodiment too the use of thumb screws means that no further tools are required.

Figure 9:
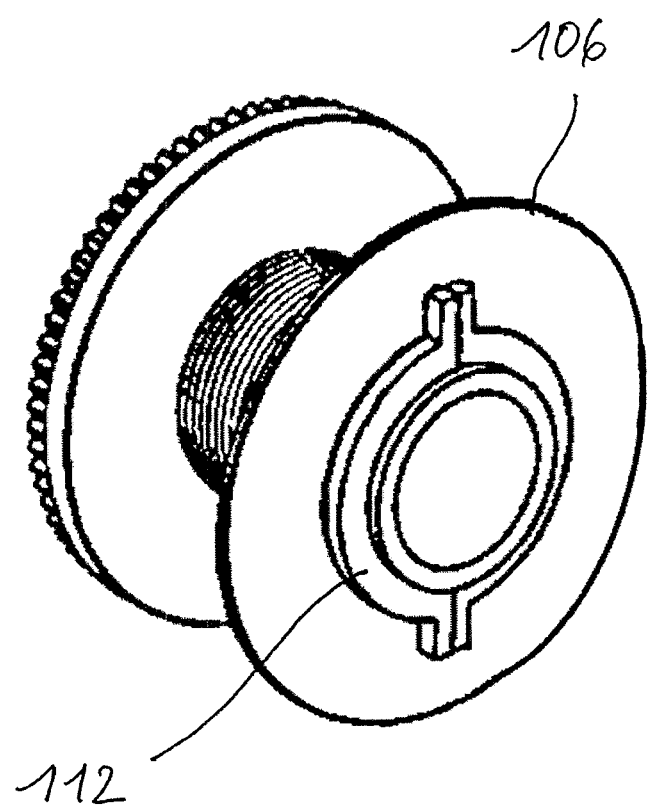
FIG. 9 shows a schematic illustration of a cable drum having a quick mounting mechanism according to one illustrative embodiment of the present invention.

FIG. 9 shows a schematic illustration of a cable drum 106 with a quick mounting mechanism 112 according to one illustrative embodiment of the present invention. The quick mounting mechanism 112 is designed to enable the cable drum 106 to be attached to a cable winch in a manually detachable manner.

The illustrative embodiments described and shown in the figures have been chosen purely by way of example. Different illustrative embodiments can be combined completely or in respect of individual features. It is also possible for one illustrative embodiment to be supplemented by features of another illustrative embodiment.

Moreover, method steps according to the invention can be repeated as well as being carried out in a different sequence to that described.

If an illustrative embodiment includes an "and/or" between a first feature and a second feature, this should be interpreted to the effect that, according to one embodiment, the illustrative embodiment has both the first feature and the second feature and that, according to another embodiment, it has only the first feature or only the second feature.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cable winch comprising:
   a receiving unit for accommodating a cable drum that includes a cable wound about an axle of the cable drum, wherein the receiving unit has a quick mounting mechanism for attaching the cable drum in a manually detachable manner to the cable winch; and
   a drive unit having at least one driving pulley, wherein the drive unit is positioned ahead of the receiving unit in a winding direction of the cable onto the cable drum and provides at least a proportion of a pulling force for raising a load by means of the cable, and wherein the drive unit receives a free cable end of the cable from the cable drum and to guide the cable,
   wherein the quick mounting mechanism is pivotable between a first position and a second position.

2. The cable winch as claimed in claim 1, wherein the driving pulley has a cable guide surface for guiding a plurality of turns of the cable.

3. The cable winch as claimed in claim 1, wherein the drive unit has at least one guide plate for guiding the cable on a cable guide surface of the driving pulley.

4. The cable winch as claimed in claim 1, wherein the drive unit has a guide roller, which is positioned ahead of the driving pulley in the winding direction of the cable onto the cable drum and is designed to guide the cable in a cable discharge region of the cable from the drive unit to a remaining region of the cable winch, said remaining region having the receiving unit.

5. The cable winch as claimed in claim 1, wherein the quick mounting mechanism has a first quick mounting device for fixing a first end section of the axle of the cable drum on the cable winch and has a second quick mounting device for fixing a second end section, situated opposite the first end section, of the axle of the cable drum on the cable winch.

6. The cable winch as claimed in claim 5, wherein the first quick mounting device and the second quick mounting device are each of a two-part design, in which a first part of the first quick mounting device is fixed on the cable winch and a second part of the first quick mounting device is pivotably connected to and movable with respect to the first part of the first quick mounting device and is designed to be connected nonpositively and/or positively to the first part of the first quick mounting device in order to fix the first end section of the axle detachably on the cable winch, and a first part of the second quick mounting device is fixed on the cable winch and a second part of the second quick mounting device is pivotably connected to and movable with respect to the first part of the second quick mounting device and is designed to be connected nonpositively and/or positively to the first part of the second quick mounting device in order to fix the second end section of the axle detachably on the cable winch.

7. The cable winch as claimed in claim 6, wherein one section of the first part of the first quick mounting device and/or one section of the first part of the second quick mounting device is designed to fit around a partial circumferential surface of the axle, and one section of the second part of the first quick mounting device and/or one section of the second part of the second quick mounting device is designed to fit around a further partial circumferential surface of the axle, said further partial circumferential surface being situated opposite the partial circumferential surface.

8. The cable winch as claimed in claim 1, wherein the quick mounting mechanism is designed as a quick clamping mechanism.

9. The cable winch according to claim 1, wherein the quick mounting mechanism is an L-shaped closing plate that is pivotable about an axis of rotation, wherein when the L-shaped closing plate is in the first position, a leg of the L-shaped closing plate retains an end section of the axle of the cable drum and wherein when the L-shaped closing plate is in the second position, the leg of the L-shaped closing plate is pivoted away from the end second of the axle of the cable drum to detach the cable drum from the cable winch.

10. A cable winch comprising:
a receiving unit for accommodating a cable drum that includes a cable wound about an axle of the cable drum, wherein the receiving unit has a quick mounting mechanism for attaching the cable drum in a manually detachable manner to the cable winch; and
a drive unit having at least one driving pulley, wherein the drive unit is positioned ahead of the receiving unit in a winding direction of the cable onto the cable drum and provides at least a proportion of a pulling force for raising a load by means of the cable, and wherein the drive unit receives a free cable end of the cable from the cable drum and to guide the cable,
wherein the drive unit has at least one guide plate for guiding the cable on a cable guide surface of the driving pulley, and
wherein the at least one guide plate is arranged on a housing of the drive unit by a hinge in such a way that the at least one guide plate is pivotable about a pivoting axis between a first position and a second position.

11. The cable winch as claimed in claim 10, wherein an inner side of the at least one guide plate is spaced apart from the cable guide surface of the driving pulley to such an extent in the first position that no more than one layer of the cable is guided on the cable guide surface during guidance of the cable in the drive unit, and/or the inner side of the at least one guide plate is spaced further apart from the cable guide surface in the second position than in the first position.

12. The cable winch as claimed in claim 10, wherein the hinge is arranged opposite a cable discharge region of the cable from the drive unit to a remaining region of the cable winch, said remaining region having the receiving unit.

13. The cable winch as claimed in claim 10 wherein the drive unit has a further driving pulley, which is clamped against the driving pulley, and a further guide plate for guiding the cable on a cable guide surface of the further driving pulley.

14. A cable winch comprising:
a receiving unit for accommodating a cable drum that includes a cable wound about an axle of the cable drum, wherein the receiving unit has a quick mounting mechanism for attaching the cable drum in a manually detachable manner to the cable winch; and
a drive unit having at least one driving pulley, wherein the drive unit is positioned ahead of the receiving unit in a winding direction of the cable onto the cable drum and provides at least a proportion of a pulling force for raising a load by means of the cable, and wherein the drive unit receives a free cable end of the cable from the cable drum and to guide the cable,
wherein the drive unit has a guide roller, which is positioned ahead of the driving pulley in the winding direction of the cable onto the cable drum and is designed to guide the cable in a cable discharge region of the cable from the drive unit to a remaining region of the cable winch, said remaining region having the receiving unit, and
wherein the guide roller is arranged on a housing of the drive unit in such a way that the guide roller is pivotable about a pivoting axis between a first position and a second position, wherein the guide roller is in contact, in the first position, with the cable guided in the drive unit, and is spaced apart, in the second position, from the cable guided in the drive unit.

15. A cable drum having a quick mounting mechanism for attaching the cable drum in a manually detachable manner to a cable winch, wherein the quick mounting mechanism is pivotable between a first position and a second position.

* * * * *